April 9, 1963 F. F. GRANT ET AL 3,084,880

SLIP CLUTCH GEAR BOX

Filed May 3, 1960 3 Sheets-Sheet 1

INVENTORS
GEORGE E. MOSHER
FREDERIC F. GRANT
BY
F. Morris Redman
ATTORNEY

April 9, 1963 F. F. GRANT ET AL 3,084,880

SLIP CLUTCH GEAR BOX

Filed May 3, 1960 3 Sheets-Sheet 2

INVENTORS
GEORGE E. MOSHER
FREDERIC F. GRANT

BY [signature]

ATTORNEY

INVENTORS
GEORGE E. MOSHER
FREDERIC F. GRANT
BY F. Munro Redman
ATTORNEY

United States Patent Office 3,084,880

Patented Apr. 9, 1963

3,084,880

SLIP CLUTCH GEAR BOX

Frederic F. Grant and George E. Mosher, Bellflower, Calif., assignors to North American Aviation, Inc.

Filed May 3, 1960, Ser. No. 26,556

7 Claims. (Cl. 242—55.13)

This invention relates to tape drive mechanisms, and particularly to an improvement in a magazine type of tape holder and drive for airborne use.

In a pending application of Malcolm F. Thompson and Frederic F. Grant entitled, "Tape Transport Means," U.S. Serial No. 24,274, filed April 25, 1960, and assigned to the assignee of the instant application, a system was described for use in assessing the value of events occurring during training flights or during an attack by airborne interceptors. The present application discloses the details of the gear box portion of the magazine and tape drive construction referred to generally in that application. It provides a more readily usable magazine for the magnetic tape upon which such data are recorded in the air, and from which they are playing back on the ground in a reproducer, for analysis of operations during flight.

This invention is disclosed as embodied in a form particularly suited for use with recording and reproducing equipment which utilizes a plurality of parallel recording tracks longitudinally of the tape. In this arrangement, the recording is primarily accomplished in digital form, using a binary coding format which eliminates amplitude level errors and reduces the translational noise inherent in previously known types of recording.

The present invention is adapted to act in cooperation with and form a part of the magazine described in the copending application referred to above, assisting in providing a more uniform tape drive speed and in improving the constancy of the tension maintained in the several parts of the tape during the recording and playback operations.

This disclosure is also concerned with an improvement in the magazine assembly and the cooperating features of the recording and playback units, which will enable the more rapid insertion and removal of the magazine, and will simplify and render more accurate the manufacture of the magazine assembly itself.

The magazine of the present embodiment is so arranged that only one critical point must be matched between the capstan in the recording or playback equipment and the location of the tape drive within the magazine. This substantially reduces the possibility of manufacturing errors, and of variations in tape tension resulting therefrom. These errors might otherwise produce inaccurate recording and reproduction by virtue of phase shifts during temporary and irregular variations in the speed of tape travel during recording and playback. The embodiment disclosed has proved to be substantially independent of recording and reproduction errors due to aging and to temperature variations.

The capstan supplies driving power to the tape directly by frictional engagement. The capstan also supplies power through means such as a belt to the gear box of the instant invention.

The gear box acts to transmit driving power to the hubs of the reels upon which the tape is wound. The hubs drive the reels through drag clutches, here shown as of the magnetic type. The torque transmitted is proportional to the difference in speed between the hubs and the reels.

An improvement in the gear box construction is described herein which permits uni-directional, but opposite, operation of the driving hubs, regardless of the direction of tape transport desired. This arrangement contributes to the smooth operation of the device, with improved recording and playback as a consequence.

In the embodiment here disclosed, the recorder is designed to permit simultaneously recording 21 individual analog signals, 42 two-valued inputs, of on-and-off signals, and one audio signal. These signals are recorded by a first set of heads in 10 parallel channels on a first pass of the tape; at the end of its travel, the tape reverses, and a second set of recording heads, displaced laterally from the first, records data in tracks intermediate thereto.

Sine wave, square wave, or direct-current level signals having a bandwidth between 0 and 3 cycles per second, such as servo or resolver signals having a suppressed carrier and using a modulation in a bandwidth of 0 to 3 cycles per second, are accepted by the input circuitry. The two-valued signals may have any true, or "on," value above +20 volts. The false, or "off," value is taken as 0 volts. The direct-current analog voltages are put through a signal-standardizing process and supplied to a multi-plexer switch for sampling at the rate of 15 times per second. The on-off signals are fed directly from the input signals to the multi-plexer and sampled 7.5 times per second.

Each sequentially sampled analog signal from the multiplexer is converted to a 7-bit binary coded signal by the assembly. The digital signals are recorded on 7 tracks of the tape, the 8th track is used to record on-off signals, and the 9th and 10th are reversed for timing and audio signals.

The reproduced unit which accepts the magazine on the ground is housed in two cabinets, a playback and a display console. The playback console accepts the tape magazine from the airborne recorder, re-winds the tape, and reproduces the data recorded during flight. The digital data are sorted, stored in registers, and translated into analog form. The on-off signals are sorted and supplied to output terminals for transmission to associated apparatus. The audio signals are reproduced through a speaker in the console. The recorded data are displayed on equipment in the reproducer which is similar to that on which it was originally displayed to the pilot in the airplane. Thus, the observer on the ground may see the progress of the entire training exercise or attack exactly as it occurred, with all the instrument data which were visually available to the pilot at that time.

When the magazine is in place in the aircraft, power for transporting the tape over the magnetic heads is supplied to it through a capstan driven by a motor in the aircraft recording system. Within the magazine, power from that motor and capstan is transmitted also through the improved gear box arrangement of the invention to the reels, to provide a carefully controlled speed relation between the tape transport speed over the magnetic heads and the speeds at which the tape is released from the supply reel and taken up by the take-up reel. The difference between the speeds of rotation of the take-up and supply reels is accomplished by the cooperation of the gear box with the magnetic slip clutches located in their respective hubs.

Two basic problems are solved by the presently disclosed embodiment. The tape is transported past the magnetic heads at constant speed. The tension in the tape is properly controlled. Finally, an improved arrangement requiring only a single alinement point is provided for connecting the tape with the driving mechanism when the magazine is placed in position for either recording or playback.

Those skilled in the art recognize that constant speed of travel past the recording and playback heads is essential to record and reproduce input data exactly. If there are speed differences between the tape as it travels in different portions of the recording, the record will be improperly made and the recorded data will be improperly reproduced when played back. Phase differences introduced by such irregularities may seriously interfere with the quality of the recording and its usefulness as a training aid.

The tape transport mechanism with which the present invention is intended to be utilized includes a synchronous motor driving the capstan at 8000 r.p.m. during the recording phase. Three-phase 400-cycle power is obtainable for this purpose from the aircraft electrical system. The equipment is designed for a re-wind speed of 23,000 r.p.m. To supply these speeds, the capstan which applies the driving power to the tape is driven at substantially 133 r.p.m. during the recording phase, and at 400 r.p.m. during the re-wind phase. With this particular equipment, recording may be continued for one hour and ten minutes on a single magazine, and the magazine may then be rewound in five and one-half minutes.

The magnetic tape used is approximately one and one-fourth inches wide, and has 20 channels extending longitudinally of the tape. The first recording head is arranged to make ten data records longitudinally of the tape simultaneously during travel of the tape in one direction. Means are provided for automatically reversing the tape at the end of its travel, and for continuing the recording in interlaced fashion, using a second recording head displaced transversely of the tape. The shifting is accomplished automatically by suitable relays at the end of the tape travel, the relays being effective to reverse the direction of tape travel and to shift the incoming signals from the first recording head to the second recording head. Such arrangements are well known in the art and form no part of the instant invention.

Since the recording time is limited, switching arrangements are provided by which the stop and start mechanism for the tape travel motor may be controlled by a relay energized by the pilot at will, or by on-target signals from the aircraft radar system, or by audio signals from the aircraft communication system.

The objects of the invention thus include providing a system for improved airborne recording and ground playback.

A further object is to provide a tape magazine construction adapted for more rapid placement in and removal from airborne recording equipment and ground playback equipment.

Another object is to provide an improved system for transmitting power from the motor driven capstan to the supply and take-up reels.

Still another object is to provide a transmission system adapted to receive a bi-directional drive and to furnish selectively two uni-directional outputs at different rotational speeds.

Yet another object is to provide two reel drives in opposite directions independent of the direction of rotation of the motor driven capstan but with selectively controlled rotational speeds.

A still further object is to provide improved means for accurate recording on a plurality of channels all of the significant data required to reproduce the events occurring during airborne operations.

A further object is to provide pilots and instructors with improved means for recording events occurring during airborne operations and studying them thereafter so that their techniques may be improved.

A still further object is to provide an improvement in tape transport magazine construction which will enable the more rapid insertion and removal of tape records in recording and playback equipment.

Yet another object is to provide a type of magazine construction which may be more readily and accurately manufactured, and which may be alined more quickly with equipment with which it is to be used.

These and other objects of the invention may be better understood by reference to the accompanying drawings, in which.

In accomplishing the objects described above, the improvement in the tape transport mechanism will be first considered. This invention in its instant embodiment requires that only one element of the magazine be precision-alined with an element of the driving portion of the recording or playback equipment. This is a more significant difference than may be initially realized, since in the service for which this invention is contemplated, the magazine may be required to operate at widely disparate conditions of temperature, and the result may be heat expansions or contractions of an unpredictable nature which will seriously interfere with the accuracy of alinement of the magazine and the recording of playback equipment. It will be appreciated that in high-altitude flights, the recording equipment may at times be subjected to extremely low temperatures and at other times may be subjected to extremely high temperatures. The range may be from about −60° F. to +120° F., and the dimensional variations which may occur under this range can seriously militate against the accuracy of the recording. However, with the present invention, since only one significant alinement point is required between the magazine and the driving capstan, irregularities due to this factor have been completely eliminated, as have those due to dimensional changes resulting from aging of the supporting cast parts.

The instant design makes it possible to emplace the magazine without requiring difficult manipulations of the driving belts and the tape. The capstan is readily engaged by the tape and the driving belt within the magazine when the latter is dropped into position and locked in place by catch means associated with its handle. Light spring restraints are used to keep the driving belt and the tape under the proper tension at all times.

As will be readily seen, since the quantity of tape on a given reel at any instant during recording is continuously changing, means must be provided for maintaining its tension constant, with the supply and take-up reel radii continually changing. In the pending application of Thompson and Grant, referred to above, an embodiment was described using a combination of magnetic clutch means in each of the hubs of the tape reels for cooperation with the gearing arrangement in the drive gear box. The gearing and clutch arrangements here shown produce a rotational force on the take-up reel which tends to produce a linear tape speed exceeding slightly the rate at which tape is transported over the magnetic heads. Contrariwise, the gearing and clutch arrangements here disclosed drive the magnetic clutch assembly in the supply reel at a speed which tends to produce a linear tape speed slightly less than the rate of transport over the heads, thus creating a drag sufficient to prevent the tape from over-running the capstan, and to maintain the tape taut at all times between the supply reel and the magnetic heads.

Figure 6:
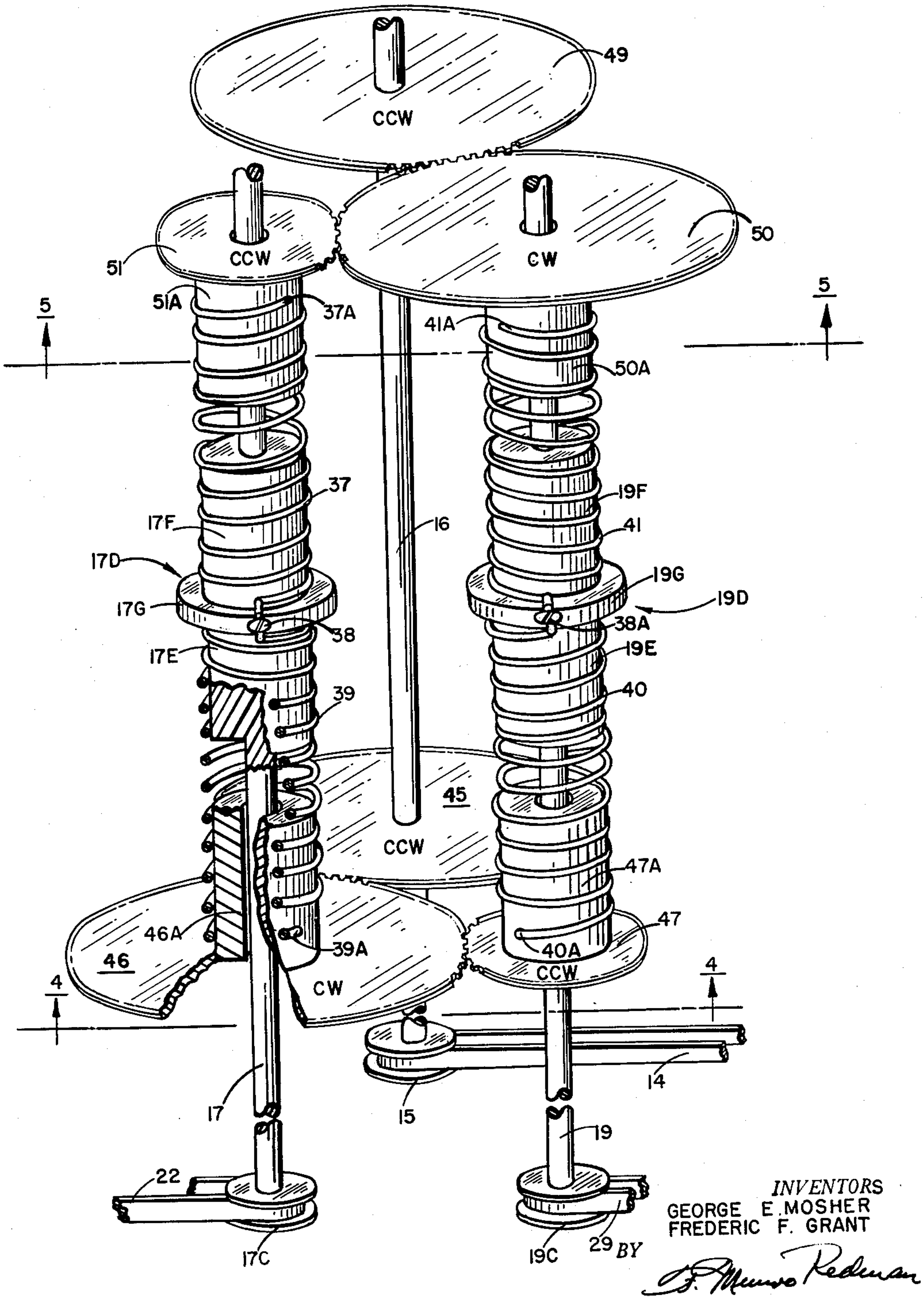
FIG. 6 is a schematic view, enlarged in scale, illustrating the operative relations of the several parts of the invention.

In the present application, an improvement is disclosed which is concerned particularly with producing the difference in hub speed necessary to insure that the tape is drawn smoothly in either direction onto the take-up reel, and held back at the supply reel, while being transported at constant linear speed past the heads. This result is secured through the operation of gear trains selectively actuated by coil spring clutches in the gear box. These coil spring clutches are seen to advantage in FIG. 3, and their effect may be better understood from the exploded schematic of FIG. 6 in connection with the description hereafter.

Figures 1, 4, 5:
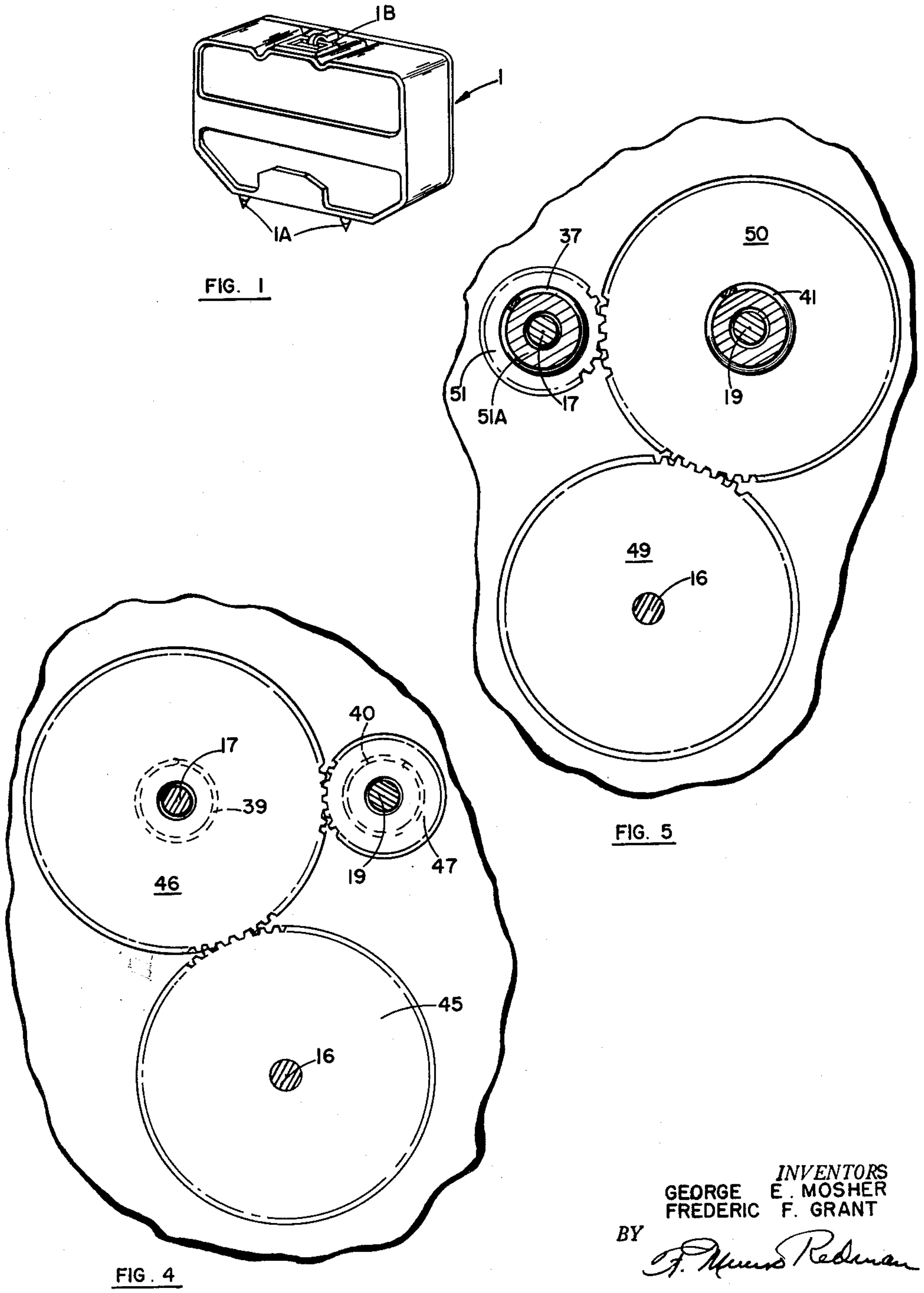
FIG. 1 is a perspective view of a magazine embodying the invention.
FIG. 4 is a schematic sectional view showing the relation of the various driving and driven elements, taken in the plane indicated by line 4—4 in FIG. 6.
FIG. 5 is a schematic sectional view, taken as indicated by line 5—5 of FIG. 6 to show additional details of the construction of the improved drive and clutching arrangement.
Figure 2:
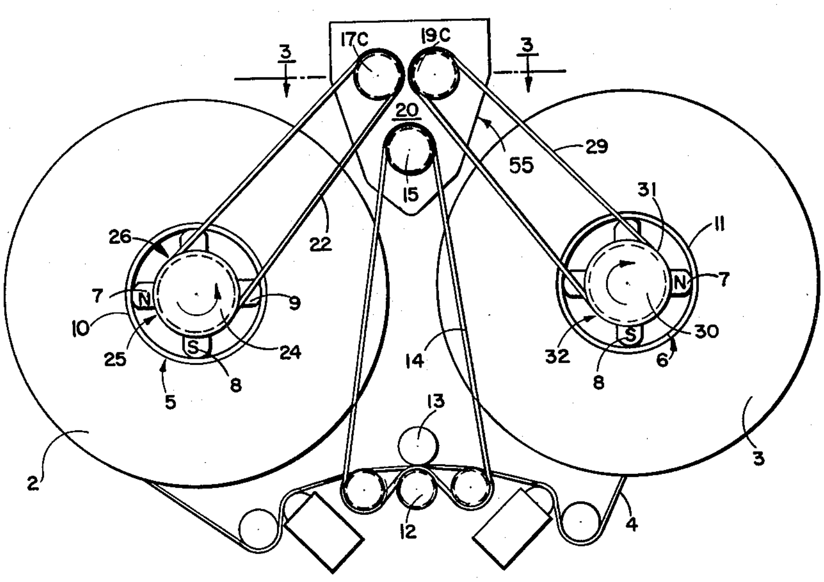
FIG. 2 is a schematic elevational view of the improved tape transport mechanism of the invention as mounted in the magazine of FIG. 1.

Referring now to FIGS. 1 and 2 of the drawing, the improved tape magazine housing the invention is shown generally at 1. A pair of mounting studs 1A and a locking handle 1B are provided to aline the magazine 1 precisely with the driving capstan in the associated equipment, so that only the location of the capstan axis is critical in manufacture. The elements cooperating with studs 1A and handle 1B form no part of the instant invention and are omitted from the drawing for clarity. The magazine encloses two tape reels 2 and 3, which act alternately as supply and as take-up members. Each of the reels 2 and 3 is mounted on a hub which acts to transmit rotational force to the reel but does not interpose a rigid mechanical connection. The rotational force operates to provide proper tape tension, in the direction dictated by the differential between the speeds of rotation of the two hubs. Transport power is supplied from the capstan, as described hereafter to draw the tape 4 from one of the reels to the other.

In the embodiment shown, the hubs 5 and 6 have the form of magnetic drag clutches, although it will be obvious that other equivalent clutch means might be employed. Hubs 5 and 6 each comprise a rotatably mounted center portion, described in detail hereafter and having a plurality of oppositely disposed north and south magnetic poles 7 and 8 disposed symmetrically about its rotational axis. Coaxially disposed for rotation about hubs 5 and 6 are magnetic rings 10 and 11, on which reels 2 and 3 are mounted. The poles 7 and 8 set up varying flux densities in the rings 10 and 11 as they are rotated. As a result, rotating magnetic fields are set up in the rings which cause current to flow therein. This current flow tends to cause a rotation of the magnetic rings 10 and 11, together with the reels 2 and 3 attached thereto. In effect, the poles and rings act like induction motors. The force acting to drive the "motor" is proportional to the difference in rotational speed between the poles and the reels.

The hubs 5 and 6 are driven in opposite directions, as indicated by the arrows on the hubs in FIG. 2, and each of them turns always in the same direction. The proper tension during left to right transport of tape 4 from one reel 2 to the other 3 is achieved by causing a first one of the hubs, 5, to rotate at a substantially lesser speed than the other 6. This will produce a rotational force on the second reel 3 tending to draw the tape onto it as a take-up reel, while the first reel 2 will introduce a drag, to prevent the tape from over-running the capstan during its function as the supply member.

When it is desired to reverse the direction of tape travel, capstan 12 is reversed, and the gear box 55 in FIG. 2 is employed to drive the hub 6 of the second reel 3 at a lesser rate of speed than reel 2. The tape will then travel back onto the first reel 2, with proper tension maintained throughout.

An idler roller 13 may be employed to increase the friction between capstan 12 and the tape 4, and also between the capstan 12 and main reel drive belt 14.

*Details of the Gear Box*

The direct drive to the gear box from the capstan in the recorder or the playback console is transmitted by the main reel drive belt 14 to a transmission input pulley 15. Pulley 15 is fixed on a main drive shaft 16 and connected by suitable gearing to first and second clutch shafts 17 and 19.

Figure 3:
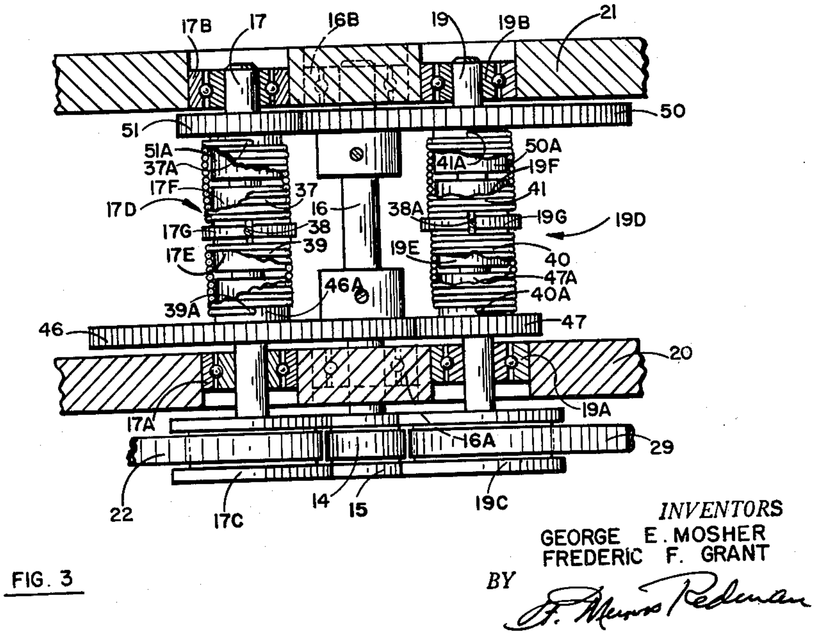
FIG. 3 is a fragmentary top view of the gear box portion of the invention as shown in FIG. 2, taken partially in section as indicated by line 3—3 of that figure.

The main drive shaft 16 and the first and second clutch shafts 17 and 19 are mounted in suitable anti-friction bearings fixed in the front gear box wall 20 and back gear box wall 21, as seen in FIG. 3. Main drive shaft 16 is supported by a bearing 16A in the front gear box wall 20 and a bearing 16B fixed in the back gear box wall 21. Similarly, front and rear bearings 17A and 17B are employed to support the first clutch shaft 17, and front and rear bearings 19A and 19B are used to support rotatably the second clutch shaft 19.

A first reel driving pulley 17C is fixed on the first clutch shaft 17, and a second reel driving pulley 19C is fixed on second clutch shaft 19. The first reel driving pulley 17C acts through means such as a first reel driving belt 22 and first reel hub pulley 24 to operate rotating portion 25 of the magnetic clutch generally indicated as 26 in the first hub 5.

Correspondingly, the second reel driving pulley 19C acts through a second reel driving belt 29 and a second reel hub pulley 30 to operate the rotating portion 31 of the magnetic clutch 32 in the second hub 6. Within the gear box 55, means are provided to transmit the driving power from the transmission input pulley 15 to the first clutch shaft 17 and the second clutch shaft 19 at rotational speeds which will maintain proper tension on the tape 4 during transport in either desired direction. These means include gearing to obtain the desired rotational hub speed and clutch means to operate the gearing in the desired direction. They are effective to drive pulleys 17C and 19C always in the same direction, rotating oppositely to each other, with the direction of tape transport dependent on the direction of rotation of the capstan 12 and input pulley 15.

*The Spring Clutch Drive*

The operation of the spring clutch means will next be considered with attention directed to FIGS. 3–6. A first inner clutch hub 17D having a bottom section 17E and a top section 17F separated by a central section 17G is mounted on and fixed to the first clutch shaft 17. Similarly, a second inner clutch hub 19D having a bottom section 19E and a top section 19F separated by a central section 19G is mounted on and fixed to the second clutch shaft 19.

Each of the inner clutch hubs has disposed therearound a pair of coil spring clutch members, wound in opposite directions on opposite sections of the hubs. These spring members may be anchored at one end to the central hub section, if desired, and have their opposite ends free. For example, on the first shaft 17, the free ends are coiled about driven clutch hub members which are freely rotatable on the hub shaft 17. Thus the upper hub section 17F has a right-hand wound coil spring 37 disposed therearound. Spring 37 may have one end secured to an anchor 38 on center hub section 17D, and its opposite end 37A free, but coiled about a coaxially disposed rear hub section 51A secured to a high speed back clutch hub driving gear 51 and rotatably mounted on first clutch shaft 17. The bottom hub section 17E has a left-hand wound coil spring 39 disposed therearound, with one end secured to the anchor 38 on center hub section 17F, and the opposite end 39A free. Free end 39A is wound around a front hub 46A which is rotatable on shaft 17 but fixed to the low speed front clutch driving gear 46. Gear 45 is always engaged with gear 46, and gear 46 with gear 47. Alternatively, the anchor at 38 may be omitted, and the tension in spring 39 relied on to exert the locking pressure on hubs 46A and 17E when rotated in the proper direction.

Similarly for the elements associated with second clutch shaft 19: bottom clutch hub section 19E has a right-hand wound coil spring 40 disposed therearound, which may be anchored at one end at 38A to center hub section 19G with its opposite end 40A free. Center hub section 19G is fixed to the second clutch shaft 19. The top hub section 19F has a left-hand wound coil spring 41 disposed therearound, anchored at one end to center hub section 19G, at 38A and with its opposite end 41A free. End 41A is, however, wound around the rear hub section 50A, which is fixed to low speed back clutch hub driving gear 50. Gear 50 and hub section 50A are mounted for free rotation on the second clutch shaft 19, but the gear is always in mesh with the back clutch hub driving gear 49 and the high speed back clutch hub driving gear 51. Here again the anchor 38A may be omitted if desired, and reliance placed on the tension in spring 40 to lock it to the hubs when they are rotating in the proper direction.

The springs 37, 39, 40, and 41 are pre-formed so that they will engage about the hubs with a relatively slight pressure. The spring will tend to tighten if the direction of rotation of the hub is opposite to the direction in which the spring is wound. When the hub is driven in the same direction as the spring is wound, the coil spring will tend to loosen. When a spring tightens, it locks the inner hub about which it is wound to the outer hub mounted coaxially therewith and about which it is also wound. This will transmit the drive from shaft 16 to the pulleys 17C and 19C at the appropriate speeds for driving reels 2 and 3, as explained below.

The effect of the spring clutches, in summary, is that the front gears are transmitting the drive from main drive shaft 16 and the back gears slipping when the tape is being transported from left to right. When the direction of tape transport is from right to left, the front gears are slipping and the back gears are transmitting the drive from shaft 16, as further explained below.

Since the hubs are fixed by their center sections 17D and 19D to the clutch shafts 17 and 19, respectively, it will be apparent that when the main drive shaft 16 of gear box 55 is driven counter-clockwise, the front hub driving gear 45 (see FIG. 4) fixed thereto will cause clockwise rotation of the meshing front low speed clutch driving gear 46, fixed on the first clutch shaft 17. This will wind up the left hand wound coil spring 39, tightening it on the inner hub 17E and on the front hub 46A secured to gear 46. These directions have been indicated by appropriate letters on the gears in FIG. 6, *cw* representing clockwise rotation, and *ccw* representing counter-clockwise rotation.

Thus the hub, 46A and the low speed driving gear 46 are locked relative to the clutch shaft 17, and driving power is transmitted to the pulley 17C in a clockwise direction, so that the reel hub 24 is driven clockwise at low speed. At the same time the spring 37 is loosened on the rear hub sections 17F and 51A, so that gear 51 may rotate freely relative to shaft 17.

The low speed driving gear 46 is also meshing with the second front clutch hub driving gear 47, turning it counter-clockwise about the second clutch shaft 19. This causes the right-hand spring 40 to tighten on inner hub 19E and the front hub 47A locking it to the second, or high speed, front clutch hub driving gear 47 fixed thereto. Torque is then transmitted through shaft 19 and pulley 19C to drive the hub 30 of reel 3 through belt 29. Hub 30 will be driven in a counter-clockwise direction at high speed. Reel 3 will then be fulfilling its requirements for tape transport in the left to right direction.

Returning now to the main driving shaft 16, which is being driven in a counter-clockwise direction: at the rear of the gear box, this shaft has fixed thereto the back clutch hub driving gear 49, which meshes with a low speed back clutch hub driving gear 50 mounted rotatably on shaft 19, driving it clockwise. Gear 50, in turn, meshes with the high speed back clutch hub driving gear 51, rotatably mounted on the first clutch shaft 17, driving it counter-clockwise. The outer clutch hub 50A fixed to gear 50 is encircled by the spring 41, which is wound in a direction to release when the hub within it rotates counter-clockwise, so in this condition that hub will not be restrained. Likewise, the outer clutch hub 51A fixed to gear 51 will not be restrained by the righ hand wound spring 37 surrounding it.

By similar sequence, the back gears 49, 50 and 51 will drive to effect rotation of the pulleys 17C and 19C when the tape is transported from right to left by the capstan. The high speed rotation will then be supplied through pulley 17C, and the low speed through pulley 19C.

Thus the spring clutch arrangement of gear box 55 is effective to provide a difference in speed between the drive transmitted to the take-up and supply reel hubs adequate to insure proper tension in the tape while it is being transported from one reel to the other. This effect is secured as a result of the direction of drive from the capstan. The individual reel hubs are driven always in opposite directions, which do not change. Their rotational speeds do change, however, when the direction of tape travel is reversed.

The gear box is thus able to supply a drive to both tape transport reel hubs which will cooperate with the magnetic clutches to produce a constant tape tension during linear tape transport over the heads, substantially independent of the amount of tape on each reel at a particular instant. By providing rotational forces tending to produce a linear transport speed onto the take-up reel slightly in excess of that at the capstan, and forces tending to restrain the tape leaving the supply reel, that is, to produce a linear transport speed slightly less than that at the capstan, the irregularities in tension in the tape tending to make it over-run either the capstan or the take-up reel have been substantially reduced. Further, whereas, the rotational speed of a reel corresponding to constant linear tape travel tends to vary inversely with the amount of tape on the reel, the effect of the magnetic clutches is directly proportional to the speed difference between the hubs and the reels. The effect of the magnetic clutches thus opposes the effect of the varying tape radius on each reel, and results in a substantially uniform tape tension, regardless of the direction of transport.

Thus the present invention provides a substantially improved drive for transporting tape within a magazine.

Although the invention has been described and illustrated in detail, it is to be clearly understood that the same is by way of illustration and example only and is not to be taken by way of limitation, the spirit and scope of this invention being limited only by the terms of the appended claims.

We claim:

1. In a tape transport mechanism having first and second reels and a tape wound about said reels and arranged to engage recording and playback heads, and having means effective to draw said tape at a uniform rate past said recording and playback heads, the combination of first and second gear means and first and second opposing unidirectional two-speed clutch means wherein retarding torque is applied to one of said reels tending to deliver tape peripherally of said reel at a linear rate slightly less than the said uniform rate at which the tape is drawn past said recording and playback heads, and overdriving torque is applied to the other of said reels tending to draw tape onto said other reel peripherally at a linear rate just slightly greater than said uniform rate at which the tape is drawn past said recording and playback heads, said retarding torque being proportional to the difference in rotational speed between said reel and a hub portion thereof, said overdriving torque being proportional to the difference in rotational speed between the hub portion of said other reel and the reel portion of the said other reel, said retarding torque and said overdriving torque being made effective through said first and second gear means opposingly actuated relative to each other by said first and second uni-directional clutch means respectively and arranged to drive the hub portions of said first and second reels respectively.

2. In combination with a magazine tape transport mechanism having a housing, a tape, reversible capstan means, drag clutch means, gear box means, first and second reels disposed therein adapted to hold said tape for transport in either of two directions past recording and playback heads, said tape being adapted to cooperate with said capstan means to receive transporting force therefrom, said magazine being adapted to cooperate with said capstan means to receive tape tensioning force therefrom, said magazine further comprising means for rotating each of said reels unidirectionally at selected rates of speed determined by the direction of transport of said tape, said means for rotating said reels being adapted to receive power from said capstan and to deliver it to said reels through said drag clutch means driven by said gear box means at predetermined speeds dependent on the direction of tape traverse.

3. A gear box transmission for use with a tape magazine having supply and take-up reels, tape disposed about and between said reels, and means for transmitting power between said transmission and said reels, comprising: a housing, a main drive shaft rotatably supported in said housing and extending therefrom to receive power transmission input means, front and back drive gears fixedly mounted on said main drive shaft; first and second clutch shafts disposed rotatably in said housing; each of said clutch shafts having fixed thereon right and left hand inner hub sections separated by a center hub section, and extending from said housing to receive reel driving output means; a first front gear driving means having an outer hub section secured thereto rotatably disposed about said first clutch shaft; a second front gear driving means having an outer hub section secured thereto rotatably disposed about said second clutch shaft, a first back gear driving means having an outer hub section secured thereto and rotatably disposed about said first clutch shaft; a second back gear driving means having an outer hub section secured thereto and rotatably disposed about said second clutch shaft; said front gear driving means disposed about said first clutch shaft being in mesh with said front drive gear on said main drive shaft, said back drive gear disposed on said second clutch shaft being in mesh with said back drive gear on said main drive shaft.

4. In a tape magazine adapted to cooperate with recording and playback heads and reversible driving capstan, a tape transport mechanism comprising: a tape for use in recording and playing back data, first and second reels adapted to supply and take up said tape, first and second unidirectional two-speed drive means cooperating with said first and second reels respectively, each said drive means comprising a slipping clutch and means for providing a torque as a function of the difference in rotational velocity between the associated reel and the associated slipping clutch for such drive means, one of said drive means providing a torque for urging one of said first and second reels to take up said tape, the other of said first and second drive means providing a torque for restraining the other of said first and second reels from delivering said tape, said clutch means including means for providing a direction of rotation of said second drive means opposed to that of said first drive means, means for providing a speed of rotation of said second drive means substantially less than that of said first drive means when said second drive means functions as a supply reel drive, and means for providing speed of rotation of said second drive means substantially greater than that of said first drive means when said second drive means functions as a take-up reel drive.

5. In a gear box transmission for use with a tape magazine having first and second reels, tape disposed about and between said reels, and bi-directional means for transmitting mechanical power between said transmission and said reels, comprising: a housing, a bi-directional main drive shaft rotatably supported in said housing, front and back drive gears fixedly mounted on said main drive shaft; first and second clutch shafts disposed rotatably in said housing, said first and second clutch shaft having a first and second center hub section fixed thereon respectively; a low-speed first and high-speed second front gear driving means having an outer hub section secured thereto rotatably disposed about said first and second clutch shaft respectively; a high-speed first and low-speed second rear gear driving means having an outer hub section secured thereto rotatably disposed about said first and second clutch shaft respectively; said first front gear driving means meshing with said front drive gear on said main drive shaft, and further meshing with said second front gear driving means; said second back gear driving means meshing with said back drive gear on said main drive shaft, and further meshing with said first back gear driving means; first front clutch means disposed about said first inner hub section and effective in a first and second direction of rotation to fix and free respectively said outer hub section of said low speed first front gear driving means rotatably relative to said first center hub section; first rear clutch means disposed about said first inner hub section and effective in said first direction and said second direction of rotation to fix and free respectively said outer hub section of said high speed first rear gear driving means rotatably relative to said first inner hub section; second front clutch means disposed about said inner hub section and effective in said first direction and said second direction of rotation to free and fix respectively said outer hub section of said low-speed second front gear driving means rotatably relative to said second inner hub section; second rear clutch means disposed about said inner hub section and effective in said first direction and said second direction of rotation to fix and to free respectively said outer hub section of said high-speed second rear gear driving means rotatably relative to said second inner hub section; first and second means adapted to produce tape tensioning forces at the hub of said first and second reel respectively and independently of the direction of tape transport.

6. A gear box transmission for use with a bi-directional tape magazine having first and second reels, tape disposed about and between said reels, and means for transmitting mechanical power between said transmission and said reels, comprising: a two-speed first clutch means cooperating with said first reel; a two-speed second clutch means cooperating with said second reel; wherein for a first direction of tape travel said first clutch means are effective to produce rotation in a first direction of the hub of said first reel acting as a take-up reel at a first speed, and said second clutch means are effective to produce rotation in a second and opposite direction of the hub of said second reel at a lesser speed than that of said first reel; and wherein for a second direction of tape travel opposite to said first direction of tape travel said first clutch means are effective to produce rotation of the hub of said first reel in said first direction of rotation but at a lesser speed than said first speed, and said second clutch means are effective to produce rotation of the hub of said second reel in said second and opposite direction of rotation but at a greater speed than that of said first reel, and means for providing tape tension as a function of the difference in rotational speed between each of said first and second reels and the respective hub thereof.

7. A tape transport comprising a reversible input shaft, first and second non-reversing output shafts, means responsive to said input shaft for driving said output shafts simultaneously at different speeds, means responsive to reversal of said input shaft for reversing the sense of the difference between the speeds of said output shafts, first and second tape reels, first and second slip clutch means for respectively driving said first and second reels from said first and second output shafts, and a reversible tape driving capstan connected to be driven by said input shaft.

References Cited in the file of this patent

UNITED STATES PATENTS 2,365,691 Fodor ------------------ Dec. 26, 1944

2,705,599 McCullough ------------ Apr. 5, 1955
2,725,200 Ward ------------------ Nov. 29, 1955
2,948,485 Cotte ------------------ Aug. 9, 1960

FOREIGN PATENTS 341,212 Germany -------------- June 28, 1918